July 26, 1932.  C. A. CAMPBELL  1,869,048
FLUID PRESSURE BRAKE
Filed Nov. 7, 1929   3 Sheets-Sheet 1

Inventor
Charles A. Campbell
By Dodge and Inn
Attorneys

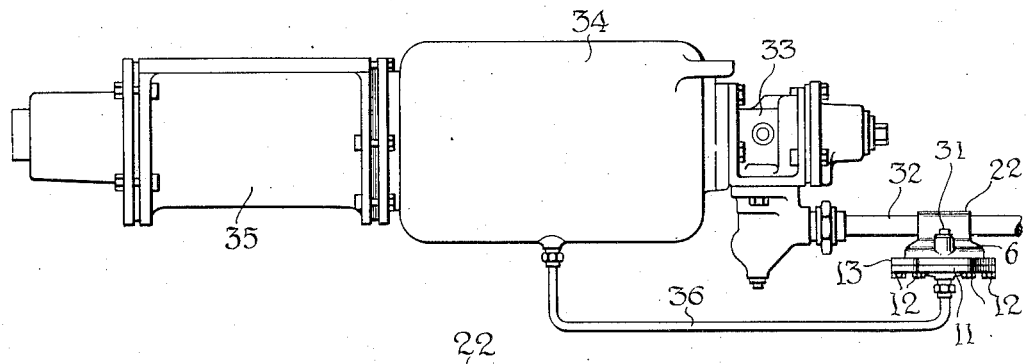
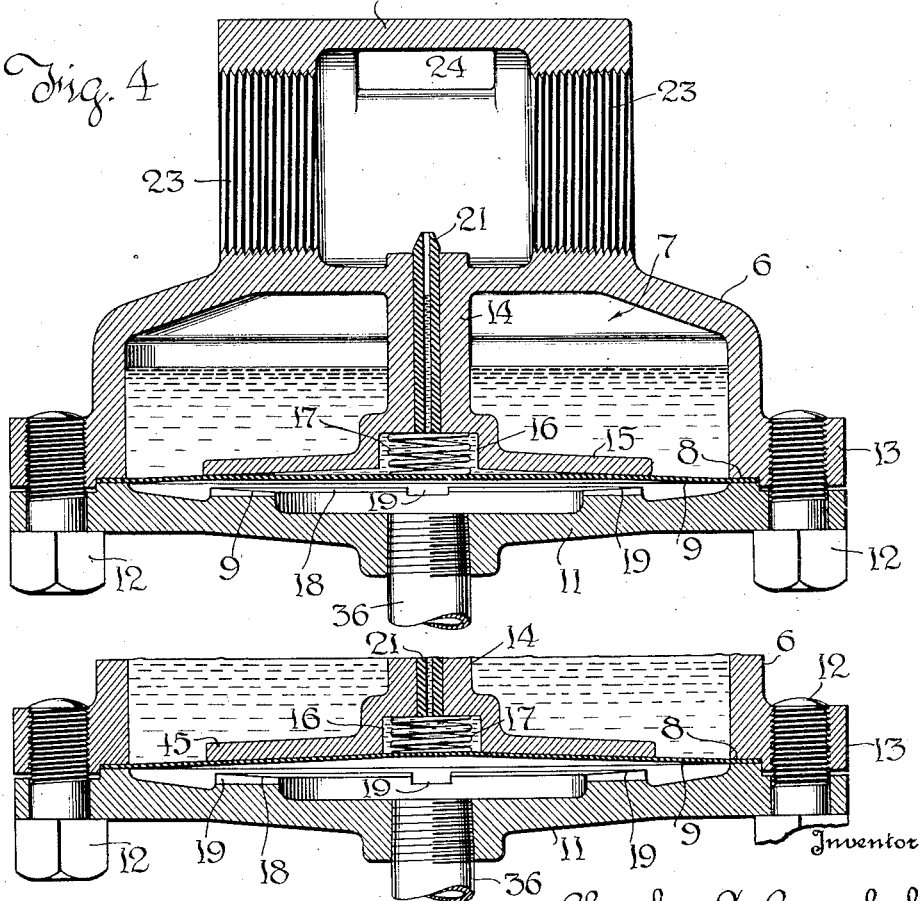

July 26, 1932. C. A. CAMPBELL 1,869,048
FLUID PRESSURE BRAKE
Filed Nov. 7, 1929 3 Sheets-Sheet 3

Inventor
Charles A. Campbell
By Dodge and Sons
Attorneys

Patented July 26, 1932

1,869,048

UNITED STATES PATENT OFFICE

CHARLES ALBERT CAMPBELL, OF WATERTOWN, NEW YORK, ASSIGNOR TO THE NEW YORK AIR BRAKE COMPANY, A CORPORATION OF NEW JERSEY

FLUID PRESSURE BRAKE

Application filed November 7, 1929. Serial No. 405,486.

This invention relates to fluid pressure brakes and analogous systems. The object of the invention is to produce an automatic device which will inject minute quantities of liquid in the system adjacent an automatic valve forming a part of the system and which will perform such injection as an incident to the normal functioning of the system.

While available for use in various relations in which its characteristic mode of operation might prove useful, the invention is primarily intended to inject into the brake pipe adjacent the triple valve, a volatile liquid, such as alcohol, which will tend to lower the freezing point of water vapor, and condensed water, and thus minimize the known tendency of triple and other valves to freeze to their seats.

The preferred embodiment of the invention will now be described in connection with the accompanying drawings, in which,—

Fig. 3 is an elevation showing the valve assembled with a combined quick service type of triple valve, auxiliary reservoir and brake cylinder.

Fig. 4 is a section on the line 4—4 of Fig. 1 showing the condition of the parts at the commencement of the injecting action.

Fig. 5 is a fragmentary view similar to a portion of Fig. 4 showing the position of the parts at the conclusion of the injecting operation.

Figure 1:
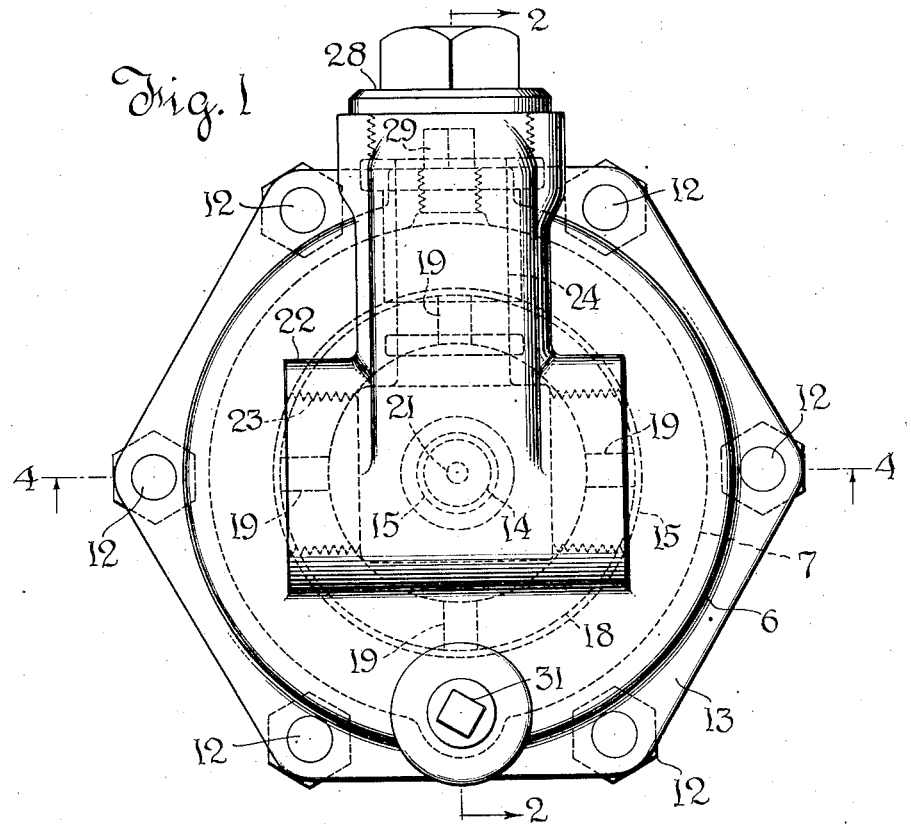
Fig. 1 is a plan view of the mechanism.

The device comprises a cylindrical shell 6 which forms a chamber 7, the shell 6 being open at its lower side and formed with a seat 8 to receive a flexible metallic diaphragm 9. This is clamped against the seat 8 by cover 11 which is held in place by machine screws 12 extending through the cover 11 and threaded into the flange 13 formed on the body 6.

Extending downward into the chamber 7 is a stem or hub 14 which carries at its lower end a disk or flange 15. This disk or flange 15 is slightly concave and preferably of conical configuration on its lower side, and is provided at the center with a chamber 16 which houses a coil spring 17. The coil spring 17 reacts downward against the diaphragm 9. The downward motion of the diaphragm 9 is limited by an annular stop 18, which is of generally conical configuration and which is notched, as indicated at 19, so that the entire space beneath the diaphragm 9, and between it and the head 11, forms a single pressure chamber. From the chamber 16 there leads a tubular nozzle 21 which discharges at its upper end into a supporting member formed as a pipe fitting 22 and internally threaded at its ends, as indicated at 23.

From the top of the interior of the pipe fitting 22 there leads a passage 24 which extends to and communicates with the chamber 7. A strainer is interposed in the passage 24, and, conveniently, comprises a mass of curled hair 25 confined between foraminous disks 26. This strainer is merely inserted in a pocket formed to receive it, and is retained by fingers 27 on the screw plug 28 which closes the opening through which the strainer is inserted. 29 is a cleanout plug, and 31 is a plug for the filling opening.

Figure 2:
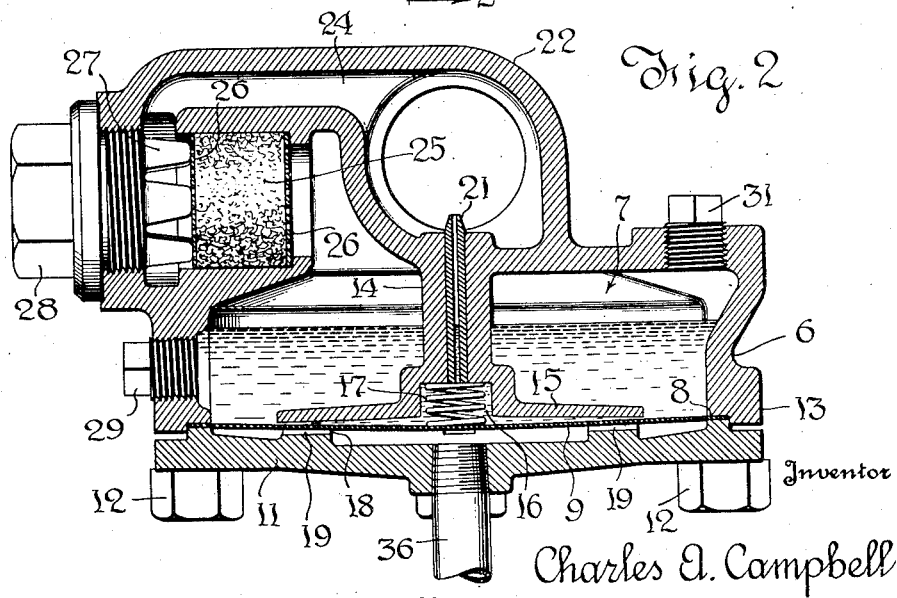
Fig. 2 is a vertical section on the line 2—2 of Fig. 1. In this view the parts are shown in the normal or inactive position prior to the commencement of the injecting function.

The parts are so proportioned that when the pressures on the diaphragm 9 are equalized, the spring 17 forces the diaphragm downward until it rests on the annular stop or rib 18. This position is shown in Fig. 2, and at such time the periphery of the disk 15 is clear of the upper face of the diaphragm 9 so that alcohol or other liquid contained in the chamber 7, penetrates the interval between the disk and the diaphragm and flows into the chamber 16, and partly up through the nozzle 21.

The parts are further so proportioned that when a predetermined pressure on the lower face of diaphragm 9 starts to force this up, the diaphragm first flexes angularly into contact with the periphery of the disk 15, the area of contact extending progressively inward as the pressure below the diaphragm 9 rises, until finally the condition illustrated in Fig. 5 marks the termination of upward movement of the diaphragm. At such time the spring 17 is overpowered and the diaphragm is in contact with the entire conical lower face of the disk 15.

In use the device is interposed in the branch pipe 32 which leads from the brake pipe or train pipe (not shown) to a conventional triple valve 33. While any conventional triple valve might be used, I prefer that known type of triple valve which is designated as a quick-service valve and functions to vent brake pipe air as the triple valve starts to move toward service position and before auxiliary air is admitted to the brake cylinder. The reason this type is preferred will be explained in connection with the operation of the mechanism.

Triple valve 33 is shown mounted at the rear end of an auxiliary reservoir 34, of conventional form, which in turn supports a brake cylinder 35, also of conventional form, and connected, as usual, with the triple valve by a passage through the auxiliary reservoir. There is a pipe connection 36 from the auxiliary reservoir 34 to and through the head 11 so that the space below the diaphragm 9 is always subject to auxiliary reservoir pressure.

During charging of the reservoir brake pipe pressure will predominate so that the diaphragm 9 will be in the position shown in Fig. 2.

Thus if alcohol or other suitable liquid is in chamber 7 it will enter the space between diaphragm 9 and disk 15. This is the case under release and running conditions.

Suppose now that a service application is made. This is produced by a reduction of brake pipe pressure with a resulting reduction of pressure in the branch pipe 32. The effect is to start the triple piston in motion toward service application position and the initial part of this motion results in venting some brake pipe air through the triple valve into the brake cylinder 35, slightly intensifying the brake pipe pressure reduction. Thus, although there is first a flow through the pipe 32 toward the brake pipe, this is immediately followed by a reverse flow through the pipe 32 from the brake pipe to the triple valve. All this happens before any air commences to flow from the auxiliary reservoir 34 through the triple valve to the brake cylinder 35.

These two flows are attended by a reduction of pressure in the pipe 32 and consequently by a reduction of pressure in the chamber 7, which is in communication with the pipe through the passage 24. Since auxiliary reservoir pressure has not commenced to drop, and since during the initial part of the service application it is always higher than brake pipe pressure, the diaphragm 9 will be forced upward. It first seals against the periphery of the disk 15, trapping a small portion of the alcohol or other liquid. Continued motion of the diaphragm upward forces this liquid toward the center and thence upward through the nozzle 21, from which it sprays into the air current passing through the fitting 22.

At the time the spray occurs the current is toward the triple valve, and it follows that the alcohol either in the form of a spray or a vapor, enters the valve and comes in contact with its moving parts. Part of the liquid will be deposited in the branch pipe 32, and when brake pipe pressure is raised, to release the brake, some of it will be swept into the front cap of the triple valve, and thus come into contact with the outer face of the triple piston and with the cylinder bushing.

In emergency application the operation is similar to that already described except that brake pipe air flows to the brake cylinder through the well known emergency check valve, and it follows that a certain amount of the alcohol mist or vapor will come into contact with the emergency valve mechanism including the emergency check valve and piston.

My invention may be used with any triple valve, but it will be observed that a quick-acting triple valve, because it involves a flow from the brake pipe toward the triple valve at the initiation of service application, renders my device peculiarly effective. In such case the liquid spray is carried directly into the service portion of the valve at each service application actuation.

Some alcohol vapor finds its way to the brake cylinder and is effective to prevent freezing of moisture on the packing cup.

The apparatus may be installed at various other points in the brake system, where it can be operated by differential fluctuation of pressures between any two charged volumes, occurring as incidents to ordinary operation.

Figure 6:
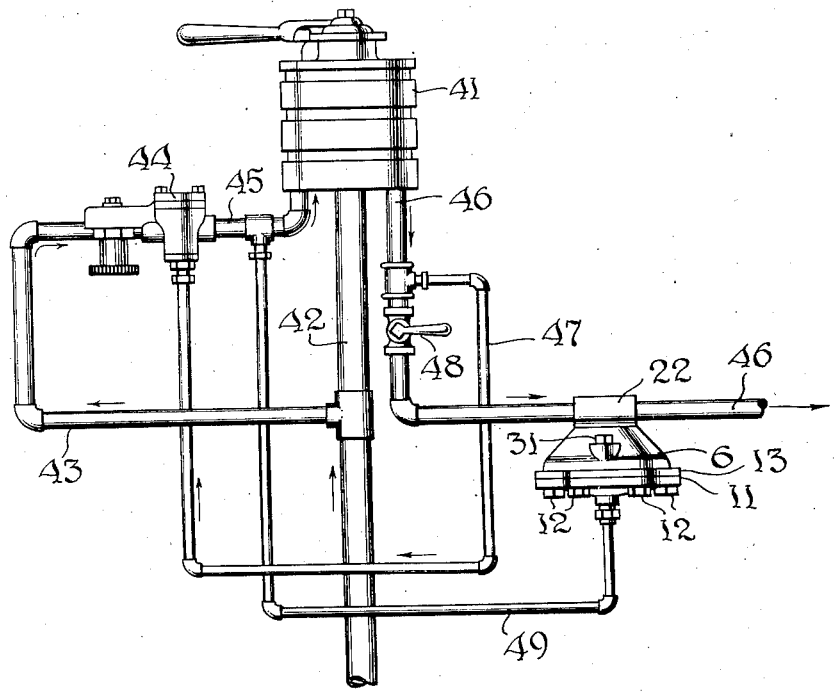
Fig. 6 is a diagram showing the invention installed adjacent the engineer's valve.

One such example is shown in Fig. 6. In this figure an ordinary six position equalizing discharge engineer's brake valve is shown at 41 and the main reservoir pipe at 42. A branch pipe 43 leads to the feed valve 44 and this delivers air to the feed port of the engineer's brake valve 41 through pipe 45 as usual. The brake pipe is shown at 46 and has a branch 47 which leads to the control portion of feed valve 44 so that the feed valve functions to maintain the desired brake pipe pressure. A double-heading cock is indicated at 48. The parts so far described conform to known practice.

Interposed in brake pipe 46 is the mechanism of Figs. 1, 2, 4 and 5 indicated by the numeral 22 applied to the pipe fitting and the numeral 6 applied to the shell. There is a pipe 49 analogous to pipe 36 of Fig. 3 which leads to the pipe 45.

It follows that the diaphragm 9 is subjected to opposing pressures which vary relatively to each other. The lower face of the diaphragm is subject to feed valve discharge pressure at all times. The upper side is subject to brake pipe pressure.

In full release position brake pipe pressure will materially exceed feed valve discharge pressure because there is free flow from the main reservoir to brake pipe. Hence in full release diaphragm 9 will be forced downward. When the valve is shifted to running position the brake pipe pressure will at first drop below feed valve discharge pressure, and then gradually build up to this pressure. Hence when the engineer's brake valve is shifted to running position, diaphragm 9 moves upward and ejects alcohol into the brake pipe, to be carried rearward through the brake system.

Other installations and various structural modifications, within the scope of the invention, will readily suggest themselves.

What is claimed is:

1. The combination with a brake system including as a part of the brake system two volumes arranged to receive air under pressures which vary relatively to one another as the system functions; of a pump for injecting a liquid into said system and operable by variations of said pressure relation.

2. The combination with a pneumatic brake system including as a part of the brake system two volumes arranged to receive air under pressures which vary relatively to one another as the system functions; of a pump including a nozzle and a liquid displacing diaphragm, the latter subject on its opposite sides to the pressures in the two volumes, said diaphragm acting to inject liquid into one of the volumes through said nozzle upon relative reduction of pressure in one of said volumes.

3. The combination with a pneumatic brake system including as a part of the brake system two volumes arranged to receive air under pressures which vary relatively to one another as the system functions; of liquid displacing means for injecting liquid into one of said volumes, said means being responsive to relative pressure changes in said volumes; and means normally holding said displacing means out of injecting position.

4. The combination with a pneumatic brake system including as a part of the brake system two volumes arranged to receive air under pressures which vary relatively to one another as the system functions; of a liquid storage chamber; a nozzle communicating with said chamber and adapted to discharge liquid into one of said volumes; and a pump including a diaphragm for forcing liquid from said chamber through said nozzle, said diaphragm being subject to and actuated by variations in the pressure relation of said volumes.

5. The combination with a brake system including as a part of the brake system two volumes arranged to receive air under pressures which vary relatively to one another as the system functions; of a liquid storage chamber; a flexible diaphragm closing said chamber; a nozzle communicating with said chamber and adapted to discharge fluid therefrom into one of said volumes; and means cooperating with said diaphragm to cut off communication between said nozzle and said chamber upon a predetermined reduction in pressure in said one volume, and upon further reduction in pressure in said one volume to discharge liquid from said nozzle.

6. The combination with a pneumatic brake system including a reservoir and a pneumatically operated valve for controlling the brake; an air supply line; a liquid storage chamber; a nozzle communicating with said chamber and adapted to discharge fluid into said air supply line; a disk having a concave depression disposed in said chamber and communicating with said nozzle; a diaphragm normally out of contact with said disk, but capable of being flexed to engage the same and displace liquid from said concave depression; and a second chamber on the other side of said diaphragm communicating with said reservoir.

7. The combination with a pneumatic brake system including an auxiliary reservoir, brake pipe and triple valve of the type which vents air from the brake pipe as it moves toward service application position, of a liquid storage chamber in communication with the brake pipe; a nozzle communicating with said chamber and arranged to discharge into the brake pipe; a disk having a concave depression, disposed in said chamber and communicating with said nozzle; a diaphragm normally out of contact with said disk, but capable of being flexed to engage the same, and displace liquid from said concave depression; and a second chamber on the other side of said diaphragm, communicating with said auxiliary reservoir.

In testimony whereof I have signed my name to this specification.

CHARLES ALBERT CAMPBELL.